United States Patent
Kim et al.

(10) Patent No.: US 9,837,660 B2
(45) Date of Patent: Dec. 5, 2017

(54) NEGATIVE ELECTRODE FOR RECHARGEABLE LITHIUM BATTERY AND RECHARGEABLE LITHIUM BATTERY INCLUDING SAME

(71) Applicant: SAMSUNG SDI CO. LTD., Yongin-si, Gyeonggi-do (KR)

(72) Inventors: Hee-Joong Kim, Yongin-si (KR); Byong-Chul Woo, Yongin-si (KR); Yi-Seop Ahn, Yongin-si (KR); Dong-Hyuk Chang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 204 days.

(21) Appl. No.: 14/799,477

(22) Filed: Jul. 14, 2015

(65) Prior Publication Data
US 2016/0064727 A1 Mar. 3, 2016

(30) Foreign Application Priority Data
Aug. 28, 2014 (KR) ........................ 10-2014-0113388

(51) Int. Cl.
| | |
|---|---|
| *H01M 4/36* | (2006.01) |
| *H01M 4/587* | (2010.01) |
| *H01M 4/583* | (2010.01) |
| *H01M 4/48* | (2010.01) |
| *H01M 10/0525* | (2010.01) |
| *H01M 4/38* | (2006.01) |
| *H01M 4/13* | (2010.01) |
| *H01M 10/052* | (2010.01) |

(52) U.S. Cl.
CPC ........... *H01M 4/364* (2013.01); *H01M 4/483* (2013.01); *H01M 4/583* (2013.01); *H01M 4/587* (2013.01); *H01M 4/13* (2013.01); *H01M 4/386* (2013.01); *H01M 4/387* (2013.01); *H01M 10/052* (2013.01); *H01M 10/0525* (2013.01)

(58) Field of Classification Search
CPC ........ H01M 4/364; H01M 4/13; H01M 4/386; H01M 4/387; H01M 4/483; H01M 4/587; H01M 4/583; H01M 10/0525; H01M 10/052

See application file for complete search history.

(56) References Cited

U.S. PATENT DOCUMENTS 7,241,534 B2  7/2007  Nishimura et al.

FOREIGN PATENT DOCUMENTS

| JP | 2010-92834 A | 4/2010 |
|---|---|---|
| KR | 10-2005-0057491 A | 6/2005 |
| KR | 10-2006-0060749 A | 6/2006 |

OTHER PUBLICATIONS

Machine English Translation of JP 2010-92834 A, 27 pages.

*Primary Examiner* — Laura Weiner
(74) *Attorney, Agent, or Firm* — Lewis Roca Rothgerber Christie LLP

(57) ABSTRACT

A negative electrode for a rechargeable lithium battery includes a negative active material including a metal-based material, crystalline carbon, and amorphous carbon, wherein an amount of the crystalline carbon is greater than that of the amorphous carbon. A rechargeable lithium battery includes the negative electrode including the negative active material.

9 Claims, 4 Drawing Sheets

NEGATIVE ELECTRODE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2014-0113388 filed in the Korean Intellectual Property Office on Aug. 28, 2014, the entire content of which is incorporated herein by reference.

BACKGROUND

1. Field

A negative electrode for a rechargeable lithium battery and a rechargeable lithium battery including the same are disclosed.

2. Description of the Related Art

Lithium ion batteries have recently been developed as commercially available high performance rechargeable batteries. Such lithium ion batteries have high energy density and excellent rapid charge and discharge characteristics and cycle performance and, thus, have rapidly expanded market share. Such lithium batteries have simple appearances due to their characteristics and stability, but their performance has been rapidly improved for commercialization.

On the other hand, a lithium polymer battery has drawn attention as a new battery for overcoming the instability, simple appearance, and high cost problems of the lithium ion battery.

However, the lithium polymer battery has a problem of electrolyte solution impregnation and increased ion polarization as a thick film having high current density. Thus, the lithium polymer battery does not realize design capacity, but shows rate capability deterioration.

SUMMARY

An aspect of one embodiment is directed toward a negative electrode for a rechargeable lithium battery having improved capacity characteristics and rate capability as a thick film.

Another aspect of an embodiment is directed toward a rechargeable lithium battery including the negative electrode for a rechargeable lithium battery.

According to one embodiment, a negative electrode for a rechargeable lithium battery includes a negative active material including a metal-based material, crystalline carbon, and amorphous carbon, where an amount of the crystalline carbon is greater than that of the amorphous carbon.

The negative electrode may have a current density of about 3 mA/cm$^2$ to about 5 mA/cm$^2$.

The metal-based material may include a silicon-based material, a tin-based material, or a combination thereof.

The metal-based material may include the silicon-based material, and the silicon-based material may include Si, SiO$_x$), a Si—C composite, a Si-Q alloy, or a combination thereof, where 0<x<2 and Q is an alkali metal, an alkaline-earth metal, a Group 13 to 16 element, a transition metal, a rare earth element, or a combination thereof, but not Si.

The metal-based material may include the tin-based material, and the tin-based material may include Sn, SnO$_2$, a Sn—C composite, Sn—R, or a combination thereof, where R is an alkali metal, an alkaline-earth metal, a Group 13 to 16 element, transition metal, a rare earth element, or a combination thereof, but not Sn.

The crystalline carbon may include natural graphite, artificial graphite, or a combination thereof.

The amorphous carbon may be soft carbon, hard carbon or a combination thereof.

The negative active material may include about 1 wt % to about 10 wt % of the metal-based material, about 50 wt % to about 94 wt % of the crystalline carbon, and about 5 wt % to about 40 wt % of the amorphous carbon.

The crystalline carbon and the amorphous carbon may be included at a weight ratio of about 1.5:1 to about 14:1.

Another embodiment provides a rechargeable lithium battery including the negative electrode.

The rechargeable lithium battery may have a pouch shape.

Other embodiments are included in the following detailed description.

A rechargeable lithium battery having improved capacity characteristics and rate capability as a thick film electrode may be realized.

BRIEF DESCRIPTION OF THE DRAWINGS

The accompanying drawings, together with the specification, illustrate embodiments of the present disclosure, and, together with the description, serve to explain the principles of the present disclosure.

DETAILED DESCRIPTION

Figure 1:
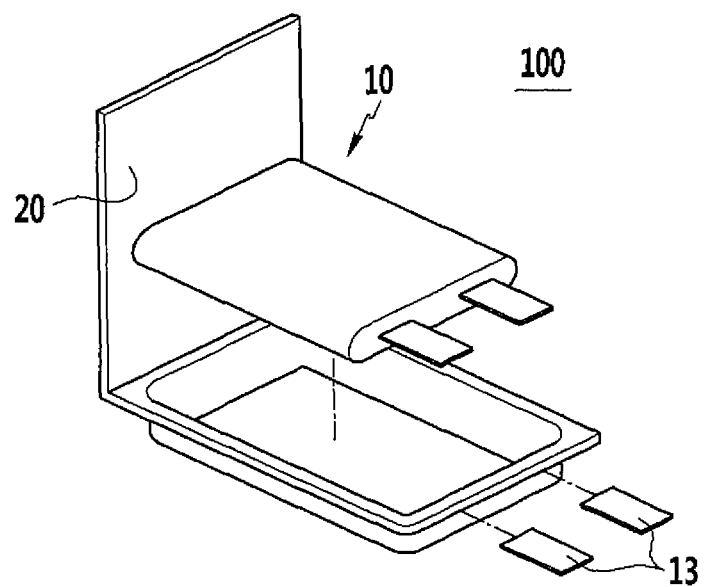
FIG. 1 is an exploded, schematic view of a rechargeable lithium battery according to one embodiment.

Hereinafter, only certain embodiments are shown and described, by way of illustration. However, these embodiments are exemplary, and this disclosure is not limited thereto. Indeed, those skilled in the art would recognize that the invention may be embodied in many different forms. Also, in the context of the present application, when a first element is referred to as being "on" a second element, it can be directly on the second element or be indirectly on the second element with one or more intervening elements interposed therebetween. Like reference numerals designate like elements throughout the specification.

A rechargeable lithium battery according to one embodiment of the present invention is illustrated referring to FIG. 1.

FIG. 1 is an exploded, schematic view of a rechargeable lithium battery according to one embodiment of the present invention.

Referring to FIG. 1, a rechargeable lithium battery 100 according to one embodiment of the present invention includes an electrode assembly 10, a battery case 20 containing the electrode assembly, and an electrode tab 13 capable of electrically channeling a current generated from the electrode assembly to the outside. The battery case 20 (e.g., a pouch case) is sealed by overlapping the two sides facing each other. An electrolyte is added or injected inside the battery case 20 housing the electrode assembly 10.

The electrode assembly 10 includes a positive electrode, a negative electrode facing the positive electrode, a separator interposed between the positive electrode and the negative electrode, and an electrolyte impregnating the negative and positive electrodes and the separator.

The negative electrode includes a negative current collector and a negative active material layer on or disposed thereon.

The negative current collector may be a copper foil, but the negative current collector is not limited thereto.

The negative active material layer may include a negative active material, and a binder, but the negative active material layer is not limited thereto.

The negative active material may include a metal-based material, crystalline carbon, and amorphous carbon, but the negative active material is not limited thereto. When the metal-based material, the crystalline carbon and the amorphous carbon are mixed and used as a negative active material for a rechargeable lithium battery, the negative active material may realize excellent capacity characteristics and rate capability of the rechargeable lithium battery.

For example, when the negative active material is used for a thick film electrode and, in addition, when the negative active material is used for a pouch-type (or kind) lithium polymer battery (e.g., a lithium battery having a pouch shape) among the rechargeable lithium batteries, capacity and rate capability may be remarkably improved.

For example, the negative electrode may be a thick film having current density in a range of about 3 mA/cm$^2$ to about 5 mA/cm$^2$, or about 3.5 mA/cm$^2$ to about 4.5 mA/cm$^2$.

The metal-based material may realize high-capacity and include a silicon-based material, a tin-based material or a combination thereof, but the metal-based material is not limited thereto.

The silicon-based material may include Si, SiO$_x$ (0<x<2), a Si—C composite, Si-Q alloy (where Q is an alkali metal, an alkaline-earth metal, a Group 13 to 16 element, transition metal, a rare earth element or a combination thereof, but not Si), or a combination thereof, but the silicon-based material is not limited thereto.

The tin-based material may include Sn, SnO$_2$, a Sn—C composite, Sn—R (where the R is an alkali metal, an alkaline-earth metal, a Group 13 to 16 element, a transition metal, a rare earth element or a combination thereof, but not Sn), or a combination thereof, but the tin-based material is not limited thereto.

The metal-based material may be included in an amount of about 1 wt % to about 10 wt %, or about 3 wt % to about 7 wt % based on the total amount of the negative active material, for example, the metal-based material, the crystalline carbon and/or the amorphous carbon. When the metal-based material is included within any of the foregoing ranges, electrolyte impregnation characteristics may be improved, and a thick film electrode realizing high active mass and simultaneously (or concurrently), design capacity may be realized.

The crystalline carbon may include natural graphite, artificial graphite, or a combination thereof, but the crystalline carbon is not limited thereto.

The crystalline carbon may be a non-shaped, sheet-shaped, flake-shaped, a spherical-shaped or fiber-shaped natural graphite, but the natural graphite is not limited thereto.

The crystalline carbon may be included in an amount of about 50 wt % to about 94 wt %, or about 55 wt % to about 90 wt % based on the total amount of the negative active material, for example, the metal-based material, the crystalline carbon and/or the amorphous carbon. When the crystalline carbon is included within any of the foregoing ranges, a thick film electrode having high active mass may be realized.

The amorphous carbon may further improve high-capacity characteristics realized by the metal-based material. The amorphous carbon may be soft carbon, hard carbon, or a combination thereof, but the amorphous carbon is not limited thereto.

The amorphous carbon may be included in an amount of about 5 wt % to about 40 wt %, or about 15 wt % to about 25 wt % based on the total amount of the negative active material, for example, the metal-based material, the crystalline carbon and/or the amorphous carbon. When the amorphous carbon is included within any of the foregoing ranges, electrolyte impregnation characteristics and simultaneously (or concurrently), low resistance and rate capability may be improved, and design capacity may be realized.

For example, the crystalline carbon may be included in the negative active material in an amount larger or greater than that of the amorphous carbon. When the amorphous carbon is included in an amount larger or greater than that of the amorphous carbon, rate capability may be improved due to excellent electrolyte impregnation characteristics, but capacity characteristics may be deteriorated. For example, the crystalline carbon and the amorphous carbon may be used in a weight ratio of about 1.5:1 to about 14:1, for example, about 1.5:1 to about 10:1, and about 2:1 to about 9:1.

The binder improves binding properties of negative active material particles with one another and with a current collector. The binder includes a non-water-soluble binder, a water-soluble binder, or a combination thereof.

In some embodiments, the non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In some embodiments, the water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth) acrylic acid and (meth)acrylic acid alkyl ester, or a combination thereof.

When the water-soluble binder is used as a negative electrode binder, a cellulose-based compound may be further used to provide. viscosity. In some embodiments, the cellulose-based compound includes one or more of carboxylmethyl cellulose, hydroxypropylmethyl cellulose, methyl cellulose, or alkali metal salts thereof. In some embodiments, the alkali metal may be Na, K, or Li. Such a thickener may be included in an amount of about 0.1 parts by weight to about 3 parts by weight based on 100 parts by weight of the negative active material.

The negative active material layer may further include a conductive material.

The conductive material is included to improve electrical conductivity. Any suitable electrically conductive material may be used as a conductive material unless it causes a chemical change. Examples of the conductive material include a carbon-based material such as natural graphite, artificial graphite, carbon black, acetylene black, ketjen black, a carbon fiber and the like; a metal-based material such as a metal powder or a metal fiber and the like of copper, nickel, aluminum, silver, and the like; a conductive polymer such as polyphenylene derivatives; or a mixture thereof.

The negative electrode may be manufactured by a method including mixing the negative active material and the binder, and optionally the conductive material in a solvent to prepare a negative active material layer composition, coating the negative active material layer composition on the current collector. The solvent may include N-methylpyrrolidone and the like, but the solvent is not limited thereto.

The positive electrode includes a current collector and a positive active material layer on or disposed on the current collector.

The current collector may include aluminum, but the current collector is not limited thereto.

The positive active material layer includes a positive active material.

The positive active material may include a compound being capable of intercalating and deintercalating lithium, for example, lithium metal oxide, but the positive active material is not limited thereto.

The lithium metal oxide may be, for example, an oxide including at least one metal selected from cobalt, manganese, nickel and aluminum and lithium. For example, a compound represented by one of the following Chemical Formulae may be used.

$Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.05$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $LiQS_2$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$ In the foregoing chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn and a combination thereof; Z is selected from Cr, V, Fe, Sc, Y, and a combination thereof; and J is selected from V, Cr, Mn, Co, Ni, Cu, and a combination thereof.

The positive active material layer may further include a binder and a conductive material.

The binder improves binding properties of the positive active material particles to each other and to a current collector. Examples of the binder include polyvinyl alcohol, carboxylmethyl cellulose, hydroxypropyl cellulose, diacetyl cellulose, polyvinylchloride, carboxylated polyvinylchloride, polyvinyifluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material provides the positive electrode with electrical conductivity. Any suitable electrically conductive material may be used as a conductive material unless it causes a chemical change in another component of the battery. Examples of the conductive material include a carbon-based material such as natural graphite, artificial graphite, carbon black, acetylene black, ketjen black, a carbon fiber and the like; a metal-based material such as a metal powder or a metal fiber and the like of copper, nickel, aluminum, silver, and the like; a conductive polymer such as polyphenylene derivative and the like; or a mixture thereof.

The electrolyte solution includes a non-aqueous organic solvent and a lithium salt.

The non-aqueous organic solvent serves as a medium for transmitting ions taking part in the electrochemical reaction of the battery. The non-aqueous organic solvent may include one selected from a carbonate-based solvent, an ester-based solvent, an ether-based solvent, a ketone-based solvent, an alcohol-based solvent, and an aprotic solvent, but the non-aqueous organic solvent is not limited thereto:

The carbonate-based solvent may include, for example, dimethyl carbonate (DMC), diethyl carbonate (DEC), dipropyl carbonate (DPC), methylpropyl carbonate (MPC), ethyipropyl carbonate (EPC), ethylmethyl carbonate (EMC), ethylene carbonate (EC), propylene carbonate (PC), butylene carbonate (BC), and the like.

When the carbonate-based solvent is prepared by mixing a cyclic carbonate and a linear carbonate, a solvent having a low viscosity while having an increased dielectric constant may be obtained. In some embodiments, the cyclic carbonate and the linear carbonate are mixed together in the volume ratio of about 1:1 to 1:9.

The ester-based solvent may include, for example, methylacetate, ethylacetate, n-propylacetate, dimethylacetate, methylpropionate, ethylpropionate, γ-butyrolactone, decanolide, valerolactone, mevalonolactone, caprolactone, and the like. The ether-based solvent may include, for example, dibutylether, tetraglyme, diglyme, dimethoxyethane, 2-methyltetrahydrofuran, tetrahydrofuran, and the like and the ketone-based solvent may include cyclohexanone, and the like. The alcohol-based solvent may include ethanol, isopropyl alcohol, and the like.

The non-aqueous organic solvent may be used singularly or in a mixture. When the organic solvent is used in a mixture, the mixture ratio can be controlled in accordance with a desirable battery performance.

The non-aqueous electrolyte solution may further include an overcharge-inhibiting additive such as ethylene carbonate, pyrocarbonate, and like.

The lithium salt dissolved in the non-aqueous organic solvent supplies lithium ions in the battery, and operates a basic operation of a rechargeable lithium battery and improves lithium ion transportation between positive and negative electrodes.

The lithium salt may include one selected from $LiPF_6$, $LiBF_4$, $LiSbF_6$, $LiAsF_6$, $LiN(SO_3C_2F_6)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, e.g., an integer of 1 to 20), LiCl, LiI, $LiB(C_2O_4)_2$ (lithium bis(oxalato) borate; LiBOB) and a combination thereof.

The lithium salt may be used at a concentration of about 0.1 M to about 2.0 M. When the lithium salt is included at the foregoing concentration range, an electrolyte may have excellent performance and lithium ion mobility due to appropriate conductivity and viscosity of an electrolyte.

The separator may include any suitable materials available in the art of lithium batteries as long as the separator is capable of separating the negative electrode from the positive electrode and capable of providing a transporting passage for lithium ions. in other words, the separator may have a low resistance to ion transportation and an excellent impregnation for an electrolyte (e.g., a capability of the separator to be impregnated with an electrolyte may be excellent). For example, the separator may include a material selected from glass fiber, polyester, polyethylene, polypropylene, polytetrafluoroethylene (PTFE), and a combination thereof. The separator may have a form of a non-woven fabric or a woven fabric. For example, a polyolefin-based polymer separator such as polyethylene, polypropylene or the like may be used for a lithium ion battery. A coated separator including a ceramic component or a polymer material may be used to provide good heat resistance and/or mechanical strength. For example, the separator may have a mono-layered or multi-layered structure.

Hereinafter, certain embodiments are described and illustrated with reference to examples. However, these examples are exemplary, and the present disclosure is not limited thereto.

Furthermore, what is not described in this disclosure may be sufficiently understood by those who have ordinary skill in this art and will not be illustrated here.

EXAMPLES 1 TO 6 AND COMPARATIVE EXAMPLES 1 TO 4

$SiO_{1.1}$ (OCAKA Titanium technologies), flake-shaped graphite (Shanghai Shanshan, SMGF), soft carbon (GS Caltex Co., GS4) and a binder were mixed with water, thereby preparing a slurry. A binder was obtained by mixing a styrene-butadiene rubber (SBR) and carboxylmethyl cellulose (CMC) at a weight ratio of 1:1.2. The foregoing materials were mixed in the amounts indicated in the following Table 1. The slurry was coated on a copper foil and then, dried and roll-pressed, thereby manufacturing a negative electrode having a current density as indicated in the following Table 1.

Then, a polyethylene separator was interposed between the negative electrode and a lithium metal, thereby manufacturing a coin cell having a pouch shape. An electrolyte solution was prepared by mixing ethylene carbonate (EC), propylene carbonate (PC), ethylmethyl carbonate (EMC) and diethyl carbonate (DEC) at a volume ratio of 25:5:40:30 and adding 1M $LiPF_6$ to the mixed solvent.

TABLE 1

| | Amount of $SiO_{1.1}$ (wt %) | Amount of flake-shaped graphite (wt %) | Amount of soft carbon (wt %) | Amount of binder (wt %) | Current density of negative electrode (mA/cm$^2$) |
|---|---|---|---|---|---|
| Example 1 | 3 | 84.8 | 10 | 2.2 | 4.57 |
| Example 2 | 3 | 74.8 | 20 | 2.2 | 4.57 |
| Example 3 | 3 | 64.8 | 30 | 2.2 | 4.57 |
| Example 4 | 1 | 66.8 | 30 | 2.2 | 4.57 |
| Example 5 | 5 | 62.8 | 30 | 2.2 | 4.57 |
| Example 6 | 9 | 58.8 | 30 | 2.2 | 4.57 |
| Comparative Example 1 | 3 | 94.8 | 0 | 2.2 | 4.57 |
| Comparative Example 2 | 3 | 0 | 94.8 | 2.2 | 4.57 |
| Comparative Example 3 | 0 | 67.8 | 30 | 2.2 | 4.57 |
| Comparative Example 4 | 3 | 27 | 67.8 | 2.2 | 4.57 |

Evaluation 1: Ion Conductivity of Negative Electrode

Ion conductivity of the negative electrodes according to Examples 1 and 3 and Comparative Example 1 was measured. The results are shown in FIG. 2.

The ion conductivity was obtained by measuring impedance depending on frequency change by using a conductivity measurement system (EC-Lab equipment) at a frequency condition of 10 mHz to 100 kHz and an output of AC 14.1 Mv.

Figure 2:
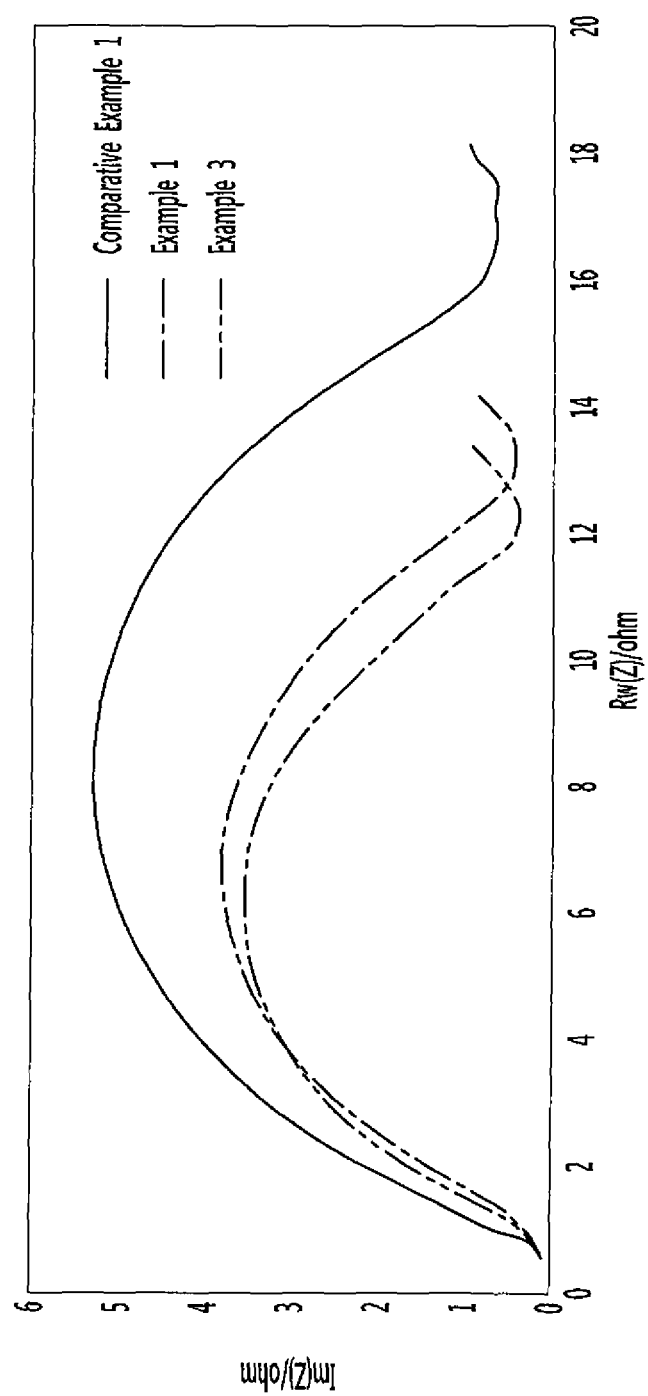
FIG. 2 is a graph showing ion conductivity of the negative electrodes according to Examples 1 and 3 and Comparative Example 1.

FIG. 2 is a graph showing ion conductivity of the negative electrodes according to Examples 1 and 3 and Comparative Example 1.

Referring to FIG. 2, the negative electrodes of Examples 1 and 3 showed small resistance, and thus, high ion conductivity as compared to the negative electrode of Comparative Example 1.

Evaluation 2: Electrolyte Solution Impregnation Characteristics

Electrolyte solution impregnation characteristics of the negative electrode according to Examples 1 and 3 and Comparative Example 1 were evaluated by dipping each electrode in the electrolyte solution and measuring its weight change depending on time. The results are shown in FIG. 3.

Figure 3:
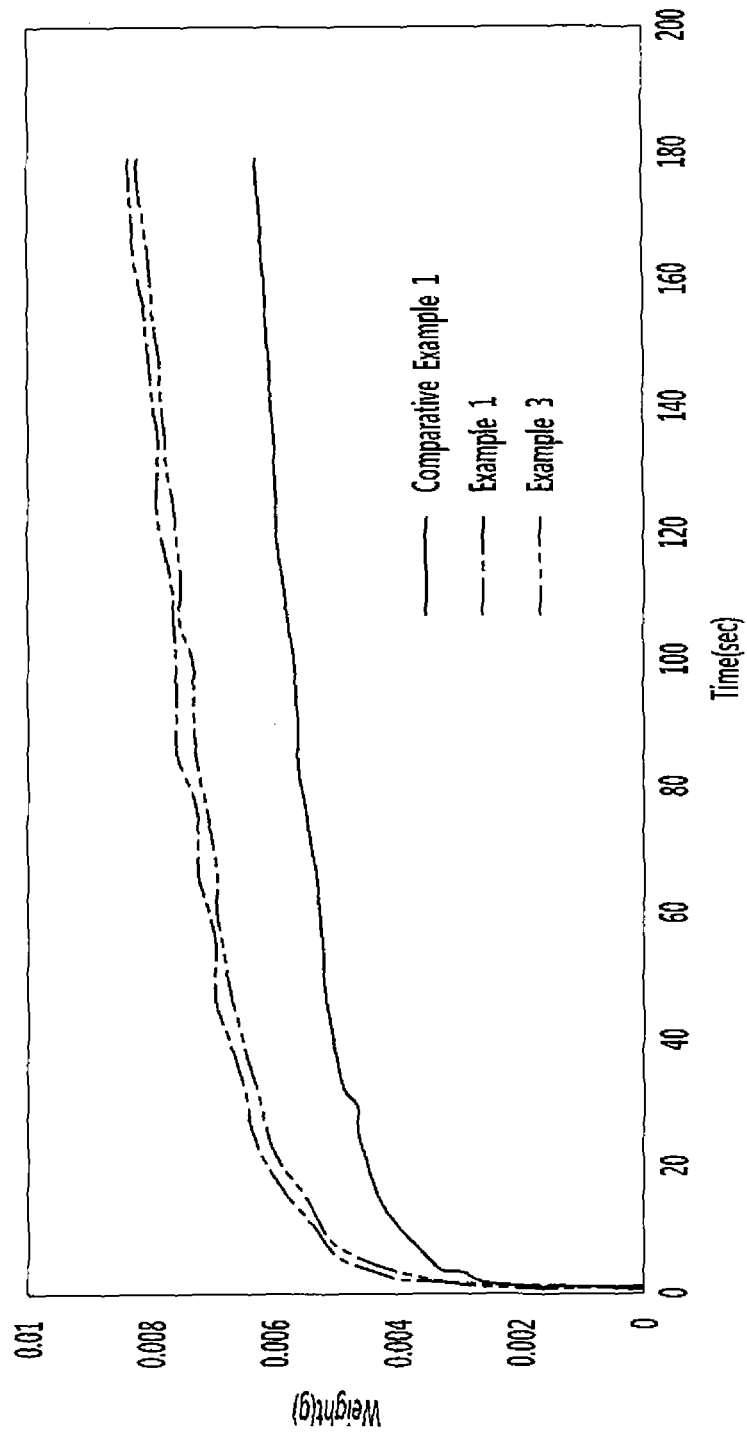
FIG. 3 is a graph showing electrolyte solution impregnation characteristics of the negative electrodes according to Examples 1 and 3 and Comparative Example 1.

FIG. 3 is a graph showing electrolyte solution impregnation characteristics of the negative electrodes according to Examples 1 and 3 and Comparative Example 1.

Referring to FIG. 3, the negative electrodes of Examples 1 and 3 showed excellent electrolyte solution impregnation characteristics as compared to the negative electrode of Comparative Example 1.

Evaluation 3: Capacity Characteristics and Efficiency of Rechargeable Lithium Battery Cell Capacity characteristics and efficiency of the rechargeable lithium battery cells according to Examples 1 to 6 and Comparative Examples 1 to 4 were measured by charging and then discharging the rechargeable lithium battery cells from 1.5 V to 0.1 V. The results are provided in the following Table 2.

In the following Table 2, the efficiency (%) was obtained as a percentage of discharge capacity at 0.2 C relative to charge capacity at 0.2 C.

TABLE 2

| | Design capacity (mAh/g) | Actual capacity relative to design capacity (%) | 0.2 C charge capacity (mAh/g) | 0.2 C discharge capacity (mAh/g) | Efficiency (%) |
|---|---|---|---|---|---|
| Example 1 | 396 | 95.96 | 385 | 380 | 99 |
| Example 2 | 388 | 96.65 | 381 | 375 | 98 |
| Example 3 | 379 | 95.78 | 370 | 363 | 98 |
| Example 4 | 352 | 98.86 | 351 | 348 | 99 |
| Example 5 | 407 | 97.05 | 403 | 395 | 98 |
| Example 6 | 474 | 92.8 | 442 | 434 | 98 |
| Comparative Example 1 | 404 | 83.6 | 348 | 338 | 97 |
| Comparative Example 2 | 392 | 89.5 | 358 | 351 | 98 |

TABLE 2-continued

|  | Design capacity (mAh/g) | Actual capacity relative to design capacity (%) | 0.2 C charge capacity (mAh/g) | 0.2 C discharge capacity (mAh/g) | Efficiency (%) |
|---|---|---|---|---|---|
| Comparative Example 3 | 376 | 90.04 | 350 | 340 | 97 |
| Comparative Example 4 | 392 | 87.2 | 352 | 342 | 97 |

Referring to Table 2, the rechargeable lithium battery cells of Examples 1 to 6 showed excellent capacity characteristics and efficiency as compared to the rechargeable lithium battery cells of Comparative Examples 1 to 4.

Evaluation 4: Rate Capability of Rechargeable Lithium Battery Cell

Rate capability of the rechargeable lithium battery cells according to Examples 1 to 6 and Comparative Examples 1 to 4 were measured by charging and then discharging the rechargeable lithium battery cells from 1.5 V to 0.1 V. The results are shown in the following Table 3. In Table 3, the CV removal refers to the constant-current charging.

TABLE 3

|  | Charge capacity (mAh) (CV removal) | | | | | Charge ratio relative to 0.2 C (%) (after CV removal) | | | | Discharge ratio relative to 0.2 C (%) | | |
|---|---|---|---|---|---|---|---|---|---|---|---|---|
|  | 0.1 C | 0.2 C | 0.5 C | 1 C | 2 C | 0.2 C | 0.5 C | 1 C | 2 C | 0.2 C | 0.5 C | 1 C |
| Example 1 | 370 | 309 | 218 | 110 | 38 | 100 | 70.5 | 36 | 12 | 100 | 99 | 93 |
| Example 2 | 367 | 307 | 209 | 105 | 36 | 100 | 68 | 34 | 12 | 100 | 99 | 92 |
| Example 3 | 379 | 313 | 217 | 102 | 35 | 100 | 69 | 32 | 11 | 100 | 98 | 92 |
| Example 4 | 362 | 310 | 208 | 102 | 30 | 100 | 67.1 | 35 | 11 | 100 | 99 | 93 |
| Example 5 | 407 | 312 | 210 | 101 | 32 | 100 | 67 | 32 | 9 | 100 | 99 | 92 |
| Example 6 | 474 | 314 | 207 | 102 | 31 | 100 | 66 | 32 | 9 | 100 | 98 | 92 |
| Comparative Example 1 | 334 | 297 | 201 | 91 | 27 | 100 | 63 | 28 | 7 | 100 | 97 | 89 |
| Comparative Example 2 | 325 | 298 | 198 | 89 | 27 | 100 | 62 | 27 | 8 | 100 | 97 | 90 |
| Comparative Example 3 | 337 | 301 | 199 | 88 | 25 | 100 | 63 | 29 | 8 | 100 | 98 | 90 |
| Comparative Example 4 | 335 | 299 | 197 | 89 | 26 | 100 | 64 | 28 | 7 | 100 | 97 | 89 |

Referring to Table 3, the rechargeable lithium battery cells of Examples 1 to 6 showed excellent rate capability as compared to the rechargeable lithium battery cells of Comparative Examples 1 to 4.

Evaluation 5: Cycle-life Characteristics of Rechargeable Lithium Battery Cell

Cycle-life characteristics of the rechargeable lithium battery cells of Examples 1 and 3 and Comparative Example 1 were measured by charging and then discharging the rechargeable lithium battery cells from 1.5 V to 0.1 V 100 times. The results are shown in FIG. 4.

Figure 4:
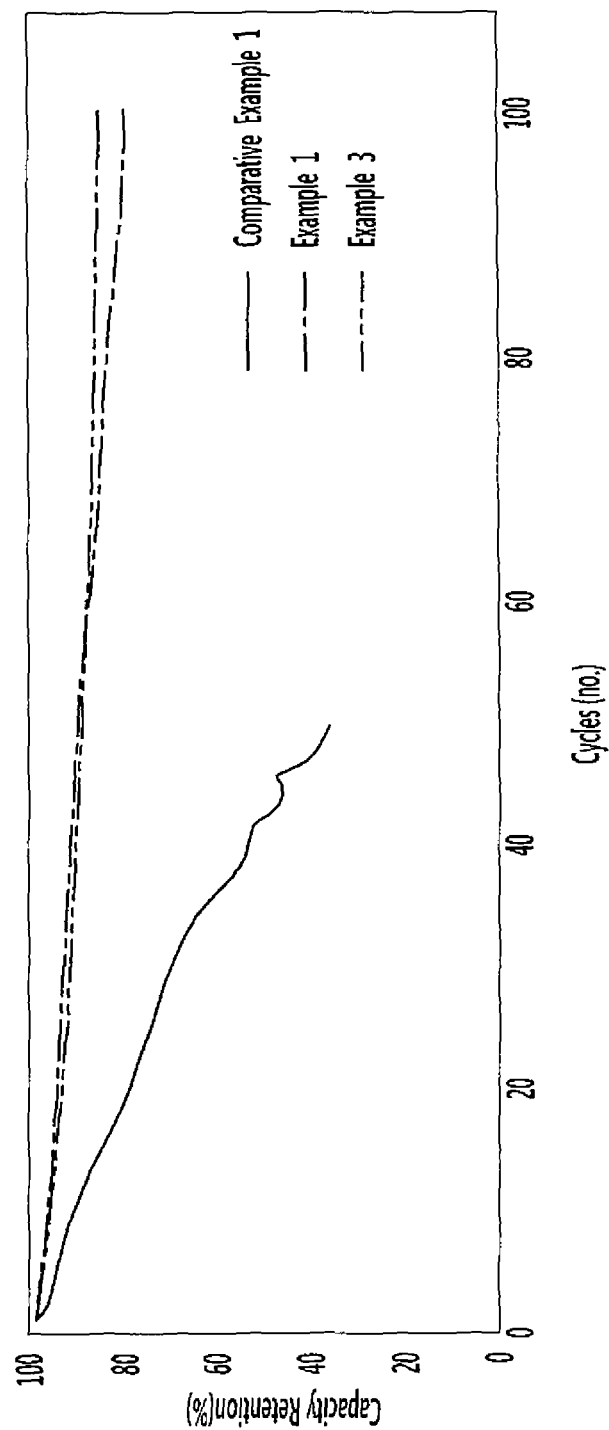
FIG. 4 is a graph showing cycle-life characteristics of the rechargeable lithium battery cells according to Examples 1 and 3 and Comparative Example 1.

FIG. 4 is a graph showing cycle-life characteristics of the rechargeable lithium battery cells of Examples 1 and 3 and Comparative Example 1.

Referring to FIG. 4, the rechargeable lithium battery cells of Examples 1 and 3 showed excellent cycle-life characteristics despite a thick film having high current density as compared to the rechargeable lithium battery cell of Comparative Example 1.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A negative electrode for a rechargeable lithium battery, comprising:
    a negative active material comprising a metal-based material, crystalline carbon, and amorphous carbon,
    wherein an amount of the crystalline carbon is greater than that of the amorphous carbon,
    wherein the metal-based material comprises a silicon-based material, and
    wherein the amount of the metal-based material is about 1 wt % to about 10 wt % of the metal-based material.

2. The negative electrode for a rechargeable lithium battery of claim 1, wherein the negative electrode has a current density of about 3 mA/cm$^2$ to about 5 mA/cm$^2$.

3. The negative electrode for a rechargeable lithium battery of claim 1, wherein the metal-based material comprises the silicon-based material, and
    the silicon-based material comprises Si, SiO$_x$, a Si—C composite, a Si-Q alloy, or a combination thereof, wherein 0<x<2 and Q is an alkali metal, an alkaline-earth metal, a Group 13 to 16 element, a transition metal, a rare earth element, or a combination thereof, but not Si.

4. The negative electrode for a rechargeable lithium battery of claim 1, wherein the crystalline carbon comprises natural graphite, artificial graphite, or a combination thereof.

5. The negative electrode for a rechargeable lithium battery of claim 1, wherein the amorphous carbon comprises soft carbon, hard carbon, or a combination thereof.

6. The negative electrode for a rechargeable lithium battery of claim 1, wherein the negative active material comprises:
    about 50 wt % to about 94 wt % of the crystalline carbon, and
    about 5 wt % to about 40 wt % of the amorphous carbon.

7. The negative electrode for a rechargeable lithium battery of claim 1, wherein the crystalline carbon and the amorphous carbon are included at a weight ratio of about 1.5:1 to about 14:1.

8. A rechargeable lithium battery comprising the negative electrode of claim 1.

9. The rechargeable lithium battery of claim 8, wherein the rechargeable lithium battery has a pouch shape.

* * * * *

UNITED STATES PATENT AND TRADEMARK OFFICE
CERTIFICATE OF CORRECTION

| | | |
|---|---|---|
| PATENT NO. | : 9,837,660 B2 | Page 1 of 1 |
| APPLICATION NO. | : 14/799477 | |
| DATED | : December 5, 2017 | |
| INVENTOR(S) | : Hee-Joong Kim et al. | |

It is certified that error appears in the above-identified patent and that said Letters Patent is hereby corrected as shown below:

In the Claims

Column 10, Line 14, Claim 1    Delete "1 wt% to about 10 wt% of the metal-based material",
Insert -- 1 wt% to about 10 wt% of the negative active material --

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*